US009212636B2

(12) United States Patent
Kaufmann et al.

(10) Patent No.: US 9,212,636 B2
(45) Date of Patent: Dec. 15, 2015

(54) FILTER

(71) Applicant: MANN+HUMMEL GMBH, Ludwigsburg (DE)

(72) Inventors: Michael Kaufmann, Meckenheim (DE); Klaus-Dieter Ruhland, Meckenheim (DE)

(73) Assignee: MANN+HUMMEL GMBH, Ludwigsburg (DE)

(*) Notice: Subject to any disclaimer, the term of this patent is extended or adjusted under 35 U.S.C. 154(b) by 151 days.

(21) Appl. No.: 14/058,932

(22) Filed: Oct. 21, 2013

(65) Prior Publication Data
US 2014/0109532 A1    Apr. 24, 2014

(30) Foreign Application Priority Data

Oct. 22, 2012 (DE) .......................... 10 2012 020 574

(51) Int. Cl.
*B01D 46/00* (2006.01)
*F02M 35/024* (2006.01)
*B01D 46/24* (2006.01)

(52) U.S. Cl.
CPC ..... *F02M 35/02433* (2013.01); *B01D 46/0046* (2013.01); *B01D 46/2411* (2013.01)

(58) Field of Classification Search
CPC ...... B01D 46/05; B01D 46/19; B01D 46/521; B01D 46/2414
USPC .......... 55/428, 495, 498, 502–504, 521, 508; 210/232
See application file for complete search history.

(56) References Cited

U.S. PATENT DOCUMENTS

| 3,429,108 | A | 2/1969 | Larson |
| 3,928,007 | A | 12/1975 | Jackson |
| 4,491,460 | A | 1/1985 | Tokar |
| 5,545,241 | A | 8/1996 | Vanderauwera et al. |
| 6,958,083 | B1 | 10/2005 | Schmitz et al. |
| 8,097,154 | B2* | 1/2012 | Dworatzek ........ B01D 46/2414 210/232 |
| 2002/0040569 | A1* | 4/2002 | Reinhold ......................... 55/498 |
| 2008/0190082 | A1* | 8/2008 | Scott et al. ....................... 55/520 |
| 2011/0083409 | A1 | 4/2011 | Bannister |

FOREIGN PATENT DOCUMENTS

| FR | 1379165 A | 11/1964 |
| WO | 2009014988 A1 | 1/2009 |
| WO | 2012037433 A1 | 3/2012 |

* cited by examiner

*Primary Examiner* — Robert Clemente
*Assistant Examiner* — Karla Hawkins
(74) *Attorney, Agent, or Firm* — James Hasselbeck

(57) ABSTRACT

An air filter has a hollow cylindrical filter housing having a first axial terminal area and a second axial terminal area and a cylindrical outer filter housing wall and a ring-shaped flow guiding wall. The ring-shaped flow guiding wall extends coaxially to the cylindrical outer filter housing wall in the interior of the filter housing. A ring-shaped flow space is formed between outer filter housing wall and flow guiding wall. A filter element of an annularly closed filter medium is disposed in the filter housing. The flow guiding wall surrounds the filter element. An inlet socket is arranged on the outer filter housing wall in the first axial terminal area and extends tangentially relative thereto. The inlet socket has a projection that projects into the ring-shaped flow space and bridges the ring-shaped flow space up to the flow guiding wall.

14 Claims, 4 Drawing Sheets

FILTER

CROSS-REFERENCE TO RELATED APPLICATION

This application claims the benefit of German patent application No. 10 2012 020 574.0 filed in Germany on Oct. 22, 2012, the entire contents of the aforesaid German patent application being incorporated herein by reference.

BACKGROUND OF THE INVENTION

The invention concerns an air filter, in particular for the intake air of internal combustion engines, comprising a hollow cylindrical filter housing and a filter element with an annularly closed filter medium that is in particular folded in a star shape.

DE 10 2010 010 964 A1 discloses an air filter that has a tangential inlet socket. The incoming air enters a ring-shaped flow channel that surrounds partially a round filter element.

The invention has the object to improve the filter of the aforementioned kind in that the flow resistance is reduced and/or the pre-separation is improved without requiring more mounting space than before.

SUMMARY OF THE INVENTION

In accordance with the present invention, this is achieved by an air filter comprising a hollow cylindrical filter housing and a filter element with an annularly closed, in particular star-shape folded, filter medium, wherein the filter housing comprises a tangential inlet socket, provided at a first axial terminal area and arranged in the cylindrical outer filter housing wall, and a ring-shaped flow guiding wall that extends coaxially in the filter housing and surrounds the filter element, wherein a ring-shaped flow space is formed between the cylindrical outer filter housing wall and the flow guiding wall, wherein the inlet socket has a projection that projects in a partial area into the ring-shaped flow space and bridges the ring-shaped flow space up to the flow guiding wall.

By means of the projection, it is achieved that within the ring-shaped flow space an annular flow that transforms into a spiral shape is generated that is more uniform and, on account of this, can be crucial for an improved pre-separation by centrifugal action as well as for a reduced pressure loss.

In relation to the inlet socket, tangential means that the inlet socket does not extend radially relative to the central axis but has a flow direction and in particular a central axis which is substantially tangential to a circular path that extends concentrically to the center axis of the filter housing. The flow passes in an inlet section from the inlet socket into the filter housing. It is preferred in this context that the inlet socket, in the outer area of the inlet section, is passing at a flat angle and/or substantially tangentially into the cylindrical outer filter housing wall. It is further preferred that the inlet socket is configured monolithic with the filter housing wall or is non-detachably connected to the filter housing wall.

In one embodiment, between the projection and the flow guiding wall a through slot is formed. By means of the through slot, it is achieved that a portion of the annular or spiral flow which is generated in the ring-shaped flow space (channel) is able to enter again the inlet section of the inlet socket and the ring-shaped flow space so that, on the one hand, the pressure loss by deflection at the projection can be reduced; on the other hand, the through slot is preferably arranged immediately at the flow guiding wall and thus in the area in which, as a result of the centrifugal action, the least number of particles are present. Accordingly, in particular the pre-separation performance can be improved.

In one embodiment, the projection has a first section, adjoining immediately the flow guiding wall or monolithically formed therewith, and a second section where the projection ends at a spacing relative to the flow guiding wall so that the through slot is formed. Preferably, the first section is closer to the axial terminal area of the filter housing than the second section, i.e, the through slot is arranged in a section of the projection that is facing away from the axial terminal area of the filter housing. In this way, an optimization relative to the deflection effect and pressure loss can be achieved. The spacing between the projection and the flow guiding wall, i.e., the height of the through slot is preferably between 1 mm and 10 mm, preferably between 1 mm and 5 mm. The through slot can have a constant height or a height that increases with increasing spacing from the axial terminal area of the housing, i.e., an increasing spacing relative to the flow guiding wall.

In one embodiment, the projection is substantially provided within the half of the inlet socket that has a smaller spacing relative to (is closer to) the central axis of the hollow cylindrical filter housing than the other half of the inlet socket and acts thus as a blockage or deflection device for the generated annular flow; this promotes the formation of a spiral flow.

In one embodiment, the flow guiding wall is arranged axis-parallel to the center axis of the hollow cylindrical filter housing and/or concentric to the cylindrical filter housing wall.

In one embodiment, the flow guiding wall covers or overlaps axially the inlet socket, i.e., projects so far into the interior of the filter housing that the flow entering through the inlet socket completely enters the ring-shaped flow space or hits the flow guiding wall. Accordingly, the pre-separation effect can be optimized and/or a non-uniform loading of the filter element can be avoided.

In one embodiment, in the axial terminal area of the filter housing a central outlet socket is arranged and is connected with the interior of the filter element.

In one embodiment, in the second axial terminal area a dust discharge opening for dust discharge by means of suction or by means of a dust discharge valve is provided.

In one embodiment, the ring-shaped flow space (channel) is delimited axially by a flat ring-shaped circumferentially extending housing wall section wherein the cross-section of the inlet socket projects past the housing wall section axially in a direction away from the interior of the filter housing. In this connection, in the inlet section of the inlet socket a transition area is provided which passes into the ring-shaped circumferentially extending housing wall section. In this way, the initiation of a spiral-shaped flow can be promoted, in particular without disadvantages in regard to pressure loss.

In one embodiment, the inlet socket has a substantially circular or oval cross-section.

In one embodiment, the inlet socket is arranged as far as possible outwardly on the housing without projecting past the maximum width of the housing. Accordingly, the diameter of the inlet socket can be greater than in prior designs so that the ratio of the diameter of the inlet socket to the diameter of the filter element is as large as possible. Accordingly, the flow resistance can be reduced so that additionally the service life of the filter element is increased. Since the inlet socket is arranged as far as possible outwardly on the housing without projecting past the maximum width of the housing, the mounting space required for the housing can stay the same as in prior designs, despite the enlarged inlet socket and the reduced flow resistance. With the inlet socket arranged as far as possible outwardly on the housing, the inlet socket can have a significantly greater width than in prior designs so that the flow resistance is additionally reduced.

The inlet socket can cover or overlap the at least one filter element across its length at least partially so that the raw air can enter the filter element at the end of the supply channel.

With regard to an especially high filter action, the filter can have a primary filter element and a secondary filter element wherein the secondary filter element preferably is arranged coaxially to and within the primary filter element.

In a preferred embodiment, the filter can be provided for an internal combustion engine.

Moreover, the filter can be used in a further preferred embodiment for a mobile compressed air compressor.

DESCRIPTION OF THE PREFERRED EMBODIMENTS

Figure 1:
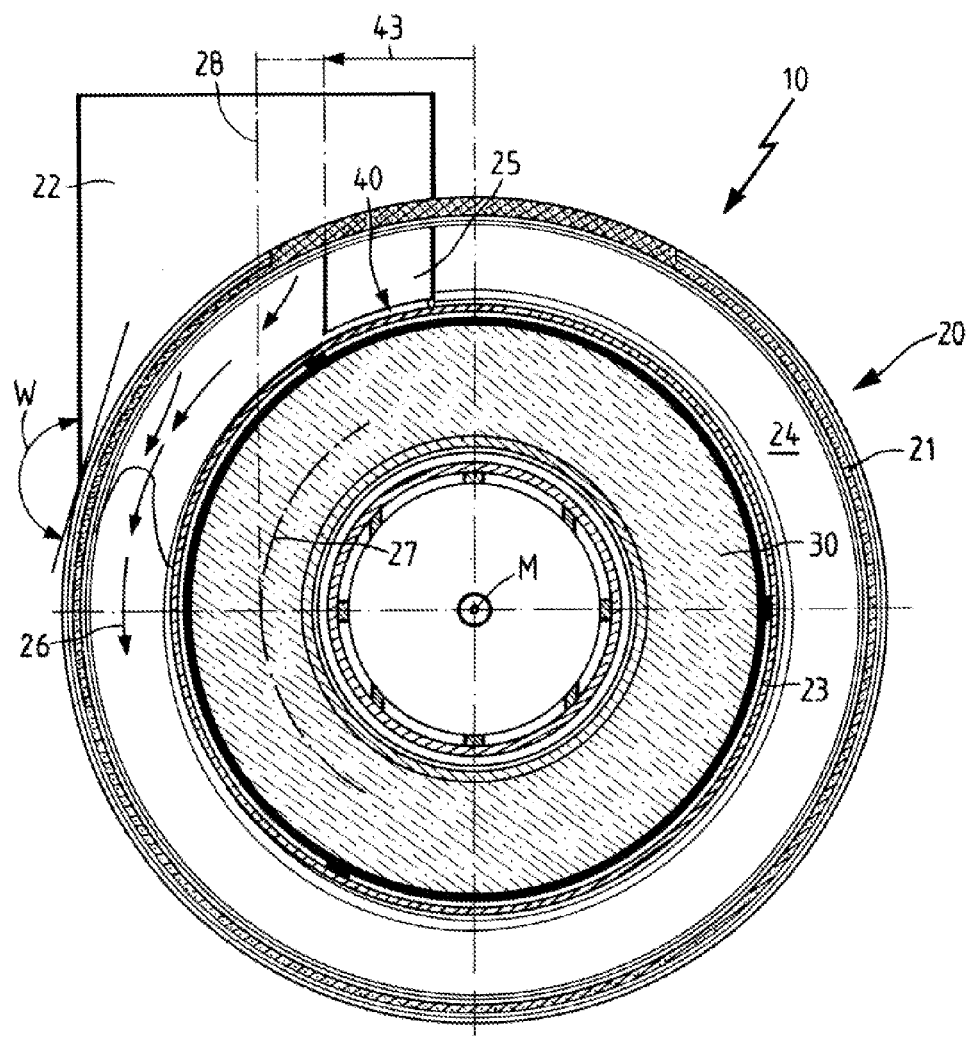
FIG. 1 shows a section view of the air filter, the section taken transversely to the center axis of the air filter.

FIG. 1 shows an air filter 10, comprising a hollow cylindrical filter housing 20 and a filter element 30 with an annularly closed, in particular star-shape folded, filter medium wherein the filter housing 20 has a tangential inlet socket 22, disposed at a first axial terminal area and arranged in the cylindrical outer filter housing wall 21, and a ring-shaped flow guiding wall 23 that extends coaxially in the filter housing and surrounds the filter element 30, wherein a ring-shaped flow space 24 is formed between the cylindrical outer filter housing wall 21 and the flow guiding wall 23. The inlet socket 22 has a projection 25 which projects in a partial area into the ring-shaped flow space 24 and bridges the ring-shaped flow space 24 up to the flow guiding wall 23.

By means of the projection 25, it is achieved that in the ring-shaped flow space 24 an annular flow that transforms into a spiral shape, indicated schematically by the arrows 26, is formed.

In relation to the inlet socket 22, tangential means that the inlet socket 22 is not oriented radially in relation to the center axis but has a flow direction and in particular has a central axis 28 which is substantially tangential to a circular path 27 that extend concentric to the central axis M of the filter housing 20. The flow passes in an inlet section from the inlet socket 22 into the filter housing 20. It is preferred in this context that the inlet socket 22 in the outer area of the inlet section passes at a flat angle W and/or substantially tangentially into the cylindrical filter housing wall 21. The inlet socket 22 and the filter housing wall 21 are monolithically made of a thermoplastic material, in particular with a glass fiber proportion.

Figure 2:
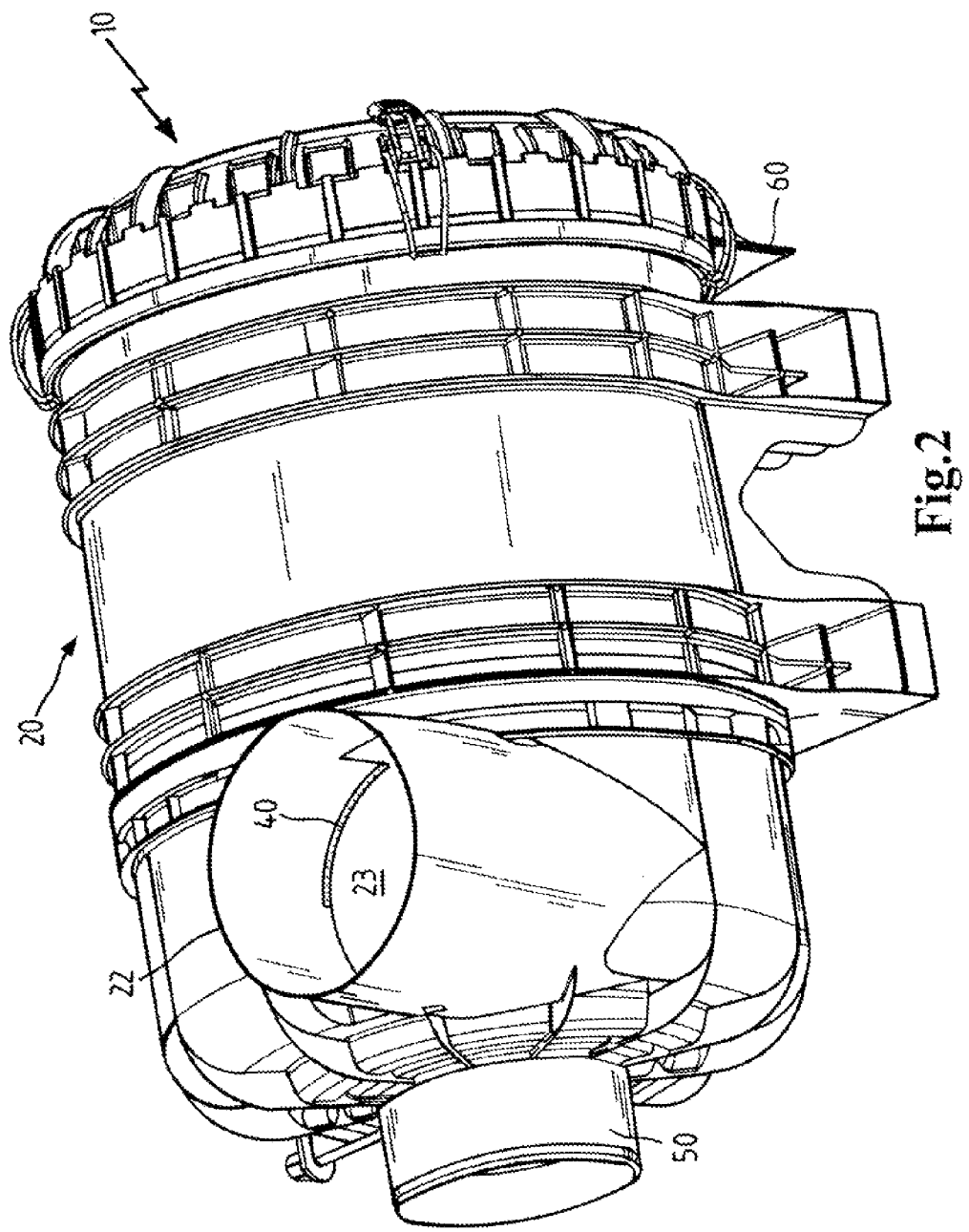
FIG. 2 shows in a perspective view the filter of FIG. 1.

Between projection 25 and flow guiding wall 23 a through slot 40 is formed, illustrated in FIG. 2 in dotted line. By means of this slot 40, it is achieved that a proportion of the ring-shaped or spiral flow 26 which is formed in the ring-shaped flow space (channel) 24 can enter again the inlet section of the inlet socket 22 and the ring-shaped flow space 24 so that, on the one hand, the pressure loss by deflection at the projection 25 can be reduced. On the other hand, the through slot 40 is preferably arranged immediately at the flow guiding wall 23 and thus in the area in which, as a result of the centrifugal action, the least number of particles are present. In this way, in particular the pre-separation performance can be improved.

Figure 3:
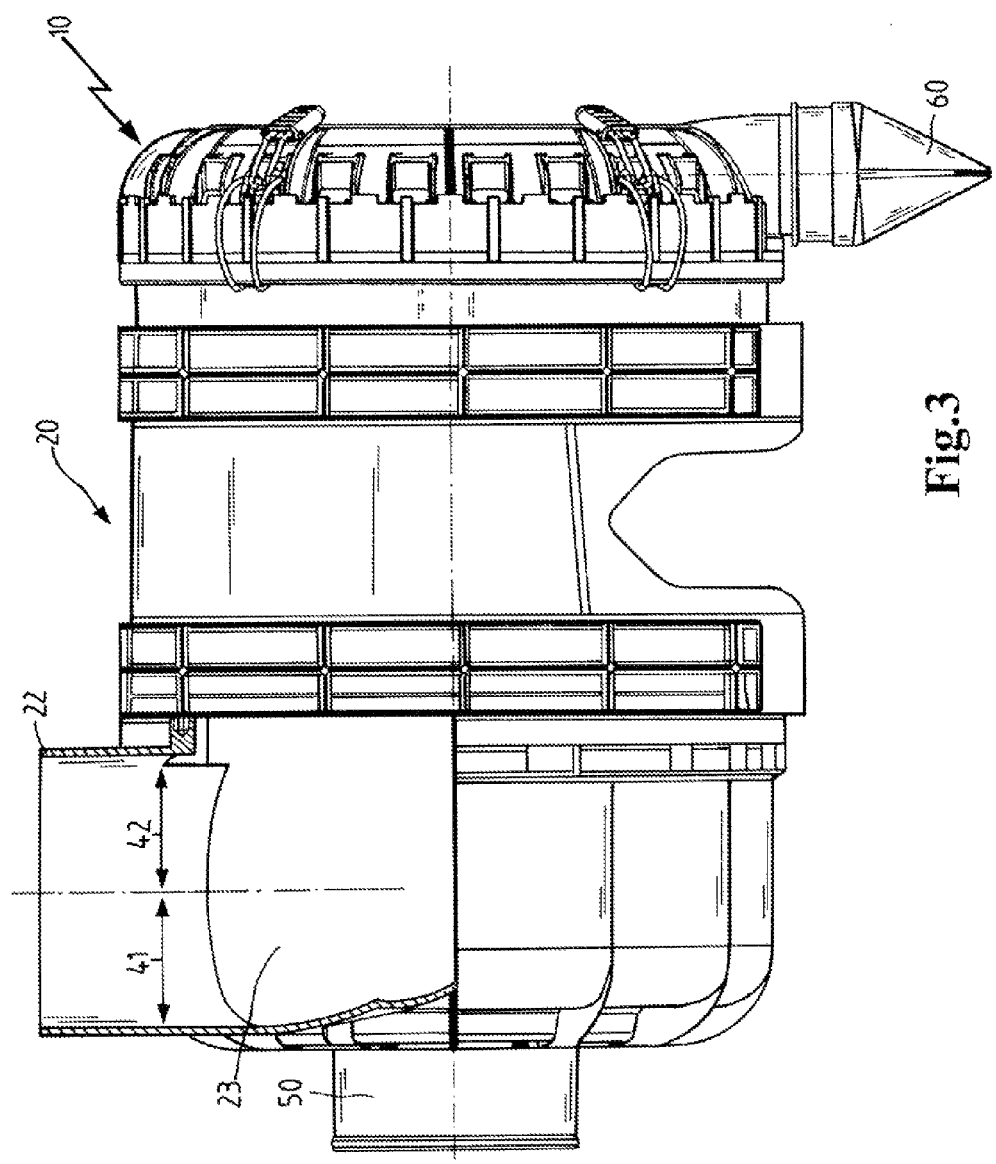
FIG. 3 is a first view, partially in section, of the filter of FIG. 1.

The projection 25 (see FIG. 3) has a first section 41 in which it adjoins immediately the flow guiding wall 23 and a second section 42 in which the projection 25 ends at a spacing relative to the flow guiding wall 23 so that the through slot 40 is formed. In this connection, the first section 41 is closer to the axial terminal area of the filter housing than the second section 42, i.e., the through slot 40 is arranged in a section of the projection 25 which is facing away from the axial terminal area. The spacing between projection 25 and flow guiding wall 23, i.e., the height of the through slot 40 is between 1 mm and 5 mm. The through slot 40 has a constant height; however, it is also conceivable to have an increasing height that increases with increasing spacing from the axial terminal area of the housing, i.e., an increasing spacing relative to the flow guiding wall 23.

The projection 25 is substantially provided within the half of the inlet socket 22 which has a smaller spacing 43 (as shown in FIG. 1) relative to the center axis M of the hollow cylindrical filter housing 20 and acts thus as a blockage or deflection device for the annular flow 26 that is being formed; the generation of a spiral-shaped flow is thus promoted.

The flow guiding wall 23 is disposed axis-parallel relative to the center axis M of the hollow cylindrical filter housing 20 and relative to the cylindrical filter housing wall 21.

Figure 4:
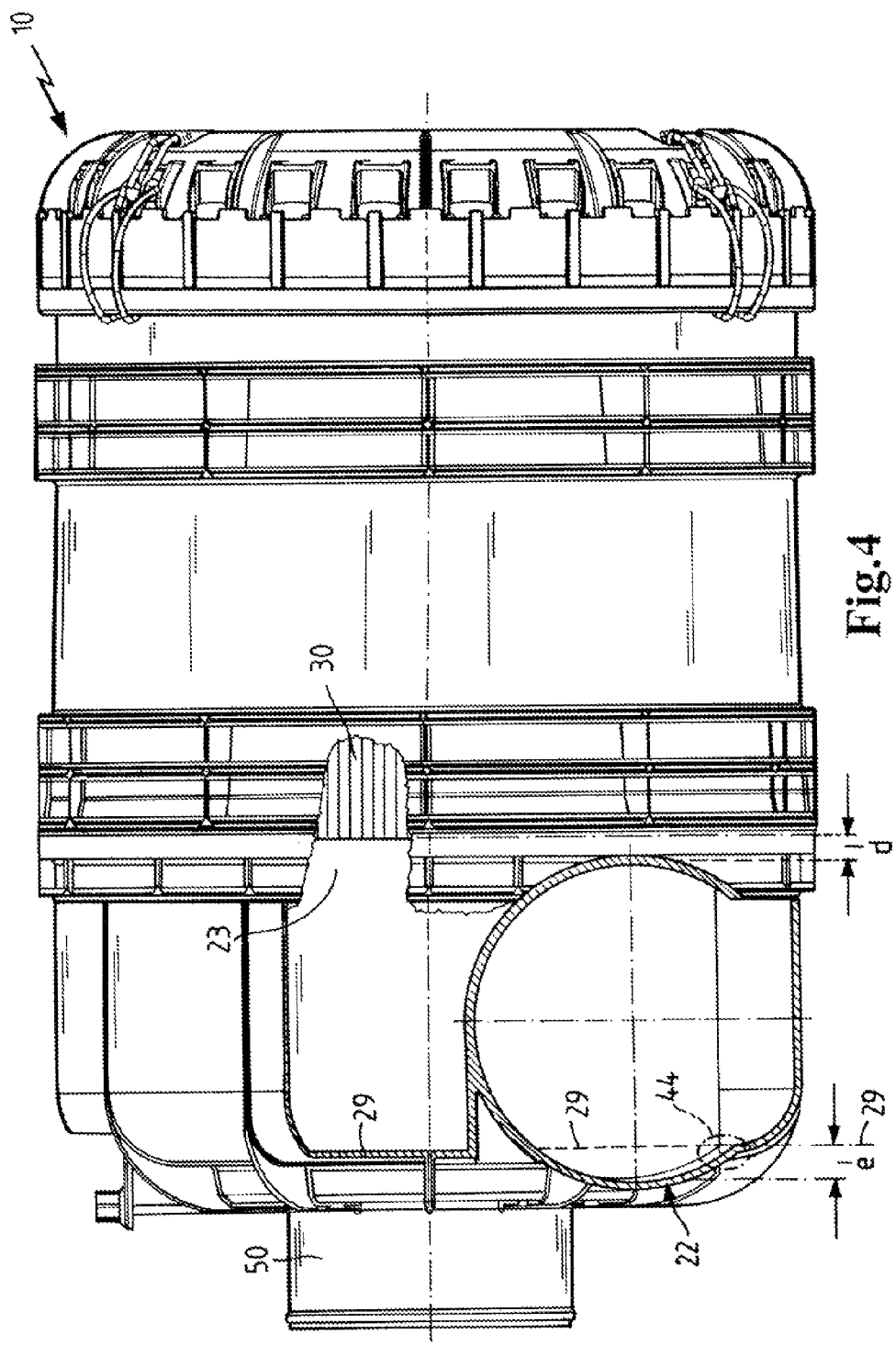
FIG. 4 is a second view, partially in section, of the filter of FIG. 1.

The flow guiding wall 23 covers or overlaps axially the inlet socket 22 (see FIG. 4), i.e, it projects so far into the interior of the filter housing that the flow that is entering through the inlet socket 22 enters completely the ring-shaped flow space 24 or hits the flow guiding wall 23. In the illustrated embodiment, the flow guiding wall 23 projects past the inlet socket 22 by the distance d.

Moreover, in the axial terminal area of the filter housing 20 a central outlet socket 50 is arranged which is connected with an interior of the filter element.

Also, in the second axial terminal area a dust discharge opening for dust discharge by means of a dust discharge valve 60 (see FIG. 3) is provided.

The ring-shaped flow space 24 is delimited axially by a flat ring-shaped circumferentially extending housing wall section 29 (see FIG. 4) wherein the cross-section of the inlet socket 22 projects past the housing wall section 29 by the distance e in axial direction away from the interior of the filter housing. In the inlet section of the inlet socket 22 there is preferably a transition area 44 provided which passes into the ring-shaped circumferentially extending housing wall section. In this way, the initiation of the spiral flow can be promoted, in particular without having to account for disadvantages in regard to pressure loss. The inlet socket 22 has a substantially circular cross-sectional shape.

The inlet socket 22, as can be seen in FIGS. 1 and 2, is preferably positioned as far as possible outwardly on the filter housing 20 without surpassing the maximum width of the housing. Accordingly, the diameter of the inlet socket 22 can be designed to be larger than before so that the ratio of the diameter of the inlet socket to the diameter of the filter element is as large as possible.

While specific embodiments of the invention have been shown and described in detail to illustrate the inventive principles, it will be understood that the invention may be embodied otherwise without departing from such principles.

What is claimed is:

1. An air filter comprising:
    a hollow cylindrical filter housing having
        a first axial terminal area and a second axial terminal area and comprising
a cylindrical outer filter housing wall, defining an interior of the filter housing, the cylindrical outer filter housing wall having:
  an inlet socket arranged on the cylindrical outer filter housing wall in the first axial terminal area,
  wherein the inlet socket extends tangentially outwards relative to the cylindrical outer filter housing wall;
  wherein the inlet socket continues by extending inwardly from the cylindrical outer filter housing wall into the interior of the filter housing; and
the filter housing having a ring-shaped flow guiding wall arranged on and extending axially inwardly from the first axial terminal area of the filter housing,
wherein the ring-shaped flow guiding wall extends inwardly coaxially to the cylindrical outer filter housing wall in the interior of the filter housing, and
wherein a ring-shaped flow space is defined by and formed radially between the cylindrical outer filter housing wall and the flow guiding wall;
a filter element disposed in the interior of the filter housing and comprising an annularly closed filter medium,
  wherein the flow guiding wall surrounds the filter element;
  wherein a projection of the inlet socket of the housing projects radially inwardly from the cylindrical outer filter housing wall into the ring shaped flow space, into a partial area of the ring-shaped flow space and bridges radially inwardly across the ring-shaped flow space up to the flow guiding wall.

2. The air filter according to claim 1, wherein
between the projection and the flow guiding wall a through slot is formed.

3. The air filter according to claim 2, wherein
the projection has a first section and a second section,
wherein the first section adjoins immediately the flow guiding wall or is monolithically formed with the flow guiding wall, and
wherein the second section is spaced at a spacing between 1 mm and 10 mm from the flow guiding wall and the spacing forms the through slot.

4. The air filter according to claim 3, wherein
the spacing is between 1 mm and 5 mm.

5. The air filter according to claim 2, wherein
the through slot is arranged at an end of the projection that is facing away from the first axial terminal area.

6. The air filter according to claim 1, wherein
the inlet socket has a first half and a second half,
wherein the first half is positioned closer to the central axis of the hollow cylindrical filter housing than the second half,
wherein the projection is arranged on the first half of the inlet socket.

7. The air filter according to claim 1, wherein
the flow guiding wall is axis-parallel to a center axis of the hollow cylindrical filter housing.

8. The air filter according to claim 1, wherein
the flow guiding wall extends in an axial direction of the filter housing so as to overlap the inlet socket.

9. The air filter according to claim 1, further comprising
a central outlet socket that is arranged in the first axial terminal area of the filter housing,
wherein the central outlet socket is connected to an interior of the filter element.

10. The air filter according to claim 1, wherein
in the second axial terminal area a dust discharge opening is provided that is adapted for dust discharge by suction.

11. The air filter according to claim 1, wherein
in the second axial terminal area a dust discharge opening with a dust discharge valve is provided.

12. The air filter according to claim 1, wherein
the ring-shaped flow space is delimited axially by a flat ring-shaped circumferentially extending housing wall section and
wherein a cross-section of the inlet socket projects in an axial direction of the filter housing past the housing wall section.

13. The air filter according to claim 1 as an intake air filter for an internal combustion engine.

14. The air filter according to claim 1, wherein
the filter medium is folded in a star shape.

* * * * *